United States Patent [19]

Thamasett et al.

[11] 3,830,290

[45] Aug. 20, 1974

[54] HEAT TRANSFER PIPE WITH LEAKAGE INDICATOR

[75] Inventors: Eberhard Thamasett, Reutti/Neu-Ulm; Ullrich Herzog, Vohringen, both of Germany

[73] Assignee: Wieland-Werke AG, Ulm, Germany

[22] Filed: Mar. 30, 1972

[21] Appl. No.: 239,715

[30] Foreign Application Priority Data
Mar. 30, 1971   Germany............................ 2115271

[52] U.S. Cl..................... 165/70, 165/11, 165/133, 165/180, 165/185, 176/37
[51] Int. Cl............................................. F28f 11/00
[58] Field of Search ............. 165/70, 180, 135, 133, 165/185; 176/37

[56] References Cited
FOREIGN PATENTS OR APPLICATIONS
703,081   1/1954   Great Britain........................ 165/70

804,592   11/1958   Great Britain........................ 165/70
1,499,286   9/1967   France................................. 165/70

Primary Examiner—Albert W. Davis, Jr.
Attorney, Agent, or Firm—Woodhams, Blanchard and Flynn

[57] ABSTRACT

There are provided three concentric pipes two of which have arranged thereon a series of tapered projections which contact an adjacent pipe. Said projections thus provide means for heat transfer from one pipe to another while permitting leakage from either the innermost pipe or the outermost pipe to flow therethrough. Pressure sensitive means are provided in communication with the respective spaces thereby provided for providing a signal in the event of such leakage.

5 Claims, 1 Drawing Figure

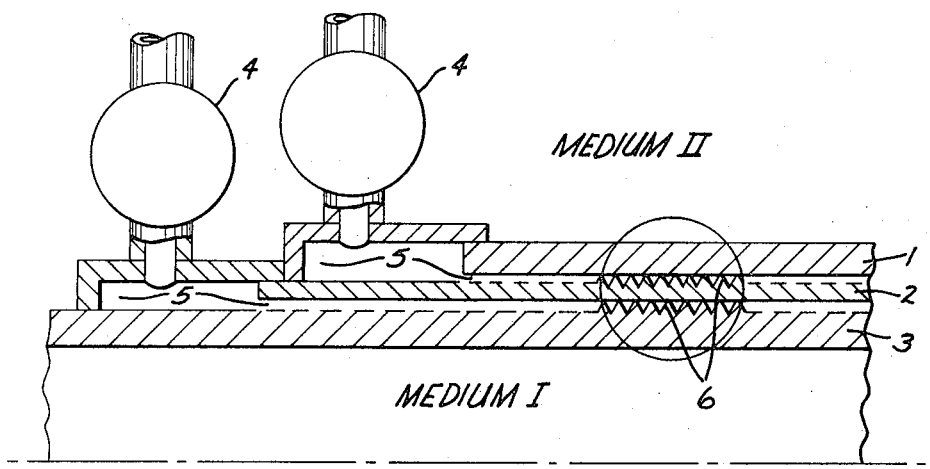

HEAT TRANSFER PIPE WITH LEAKAGE INDICATOR

The invention relates to a heat transfer conduit with a leakage indicator, which conduit consists of at least two concentric pipes, between which, if desired, the leaking medium can penetrate.

Such pipes are known for example from DAS No. 1,501,512. A desired spacing between the pipes is obtained according to this disclosure by heat-conducting, flexible disks. The space is filled with the gas which serves as leakage indicator. However, the pipe so described has the following disadvantages: It is expensive to manufacture; there is no definite positioning of the inner pipe with respect to the outer pipe due to the flexible disks; the heat conductivity is reduced by the reduced "rib efficiency" resulting from the relatively long, thin disks.

A major purpose of the invention is to provide a heat transfer conduit with a safe leakage indicator in which the mentioned disadvantages are eliminated and which can be manufactured and used in a simple manner.

This purpose of the invention is attained by providing the outer surface of each inner pipe with a plurality of pyramid-or pyramid-frustum-shaped spacers which result in defining a definite distance between the concentric pipes with respect to one another and due to the intimate contact secure at the same time a good heat conductivity between the adjacent pipes.

The pipe has the advantage of providing a particularly good heat conduction and at the same time a very safe leakage indication. The latter is also obtained in the case of very short surface cracks. According to the invention, the relationship between the contact surface and the base surface of the pyramidal spacers or the pyramid frustum shaped spacers, are chosen as small as possible. The contact surface is in this arrangement the surface of the pyramid point or top surface of the pyramid frustum, which pyramid point penetrates into the wall of the surrounding pipe. It has been unexpectedly found that even in the case of a small contact surface, an excellent heat transfer is assured. For example, with a contact ratio of, for example, 1 to 4, only a 10 percent loss in heat transfer is experienced as compared, for a standard, to two telescoped smooth pipes which contact each other closely on their entire surfaces. For a safe leakage-indicating signal the cross-sectional area of the space formed by two pipes is sufficient, also in the case of larger surface relationships as for Example 2 to 4.

The only FIGURE illustrates, in a central longitudinal section, as an exemplary embodiment, a heat transfer conduit with leakage indicator. Said conduit consists of three concentric pipes (1), (2) and (3). Liquid natrium is, for example, provided as Medium I inside the innermost pipe (3), and acts to heat Medium II, as water, including water vapor, which flows around the external surface of the outer pipe (1). Such a pipe is usable in the reactor art. Pressure measuring devices 4, such as pressure sensitive valves, are mounted in communication respectively with each of the chambers 5. In the case of a leakage, the appropriate pressure measuring device 4 emits or triggers an alarm signal in response to a change in the pressure in the corresponding space (5). The thermal diffusion pipe (2) assures a separate leakage indication for each of the inner pipe (3) and the outer pipe (1). The pyramid-shaped spacers are identified by the numeral (6) and are illustrated in detail in the circle.

It will be noted that although the pyramid-shaped spacers are provided on inner pipes 2 and 3 and directed outwardly and such is preferred for obvious reasons for manufacture convenience, it is at least conceptually possible to provide said spacers on the inner surfaces of pipes 1 and 2 and cause same to project inwardly. It is equally possible to provide such spacers on the inner and outer surface of pipe 2 only or on the inner surface of pipe 1 and the outer surface of pipe 3. However, as above indicated, the form shown in the drawings is definitely preferred for reasons of fabrication.

We claim:

1. In a heat transfer pipe having leakage indicator means associated therewith comprising at least two concentric pipes between which a leaking medium can penetrate should one of said concentric pipes crack, the improvement comprising a plurality of closely spaced spacers on at least one of said pipes and engaging the other of said pipes, said spacers having one of a pyramid-and pyramid-frustum-shape so that the spacing between the top of each of said one of said pyramid- and said pyramid-frustum-shaped spacers defines a space for an effective system to indicate leakage, the heat in one pipe being transmitted to the next radially spaced pipe through said one of said pyramid-and said pyramid-frustum-shaped spacers.

2. The improvement according to claim 1, wherein three concentric pipes are provided; and
   wherein the spacers are provided on the outer surfaces of the middle and innermost pipes.

3. The improvement according to claim 1, wherein the contact ratio is in the range of 1:4 to 2:4.

4. The improvement according to claim 1, wherein the contact ratio is 1:4.

5. The improvement according to claim 1, wherein the contact ratio is 2:4.

* * * * *